US006586538B2

(12) United States Patent
Ford et al.

(10) Patent No.: US 6,586,538 B2
(45) Date of Patent: Jul. 1, 2003

(54) PROCESS FOR PRODUCING POLYOLEFINS

(75) Inventors: Randal Ray Ford, Longview, TX (US); Jeffrey James Vanderbilt, Longview, TX (US); Roxanna Lea Whitfield, Longview, TX (US); Glenn Edward Moore, Longview, TX (US)

(73) Assignee: Eastman Chemical Company, Kingsport, TN (US)

( * ) Notice: Subject to any disclaimer, the term of this patent is extended or adjusted under 35 U.S.C. 154(b) by 164 days.

(21) Appl. No.: 09/855,829

(22) Filed: May 15, 2001

(65) Prior Publication Data

US 2001/0044505 A1 Nov. 22, 2001

Related U.S. Application Data

(63) Continuation-in-part of application No. 09/387,598, filed on Aug. 31, 1999, now abandoned.

(51) Int. Cl.$^7$ .................................................. C08F 2/34
(52) U.S. Cl. ..................... 526/74; 526/127; 526/128; 526/129; 526/160; 526/206; 526/348.2; 526/348.4; 526/348.5; 526/348.6; 526/901; 526/943
(58) Field of Search ......................... 526/74, 127, 128, 526/129, 160, 206, 348.2, 348.4, 348.5, 348.6, 901, 943

(56) References Cited

U.S. PATENT DOCUMENTS

| 3,709,853 | A | | 1/1973 | Karapinka |
|---|---|---|---|---|
| 4,003,712 | A | | 1/1977 | Miller |
| 4,011,382 | A | | 3/1977 | Levine et al. |
| 4,012,573 | A | | 3/1977 | Trieschmann et al. |
| 4,076,698 | A | | 2/1978 | Anderson et al. |
| 4,302,566 | A | | 11/1981 | Karol et al. |
| 4,532,311 | A | | 7/1985 | Fulks et al. |
| 4,543,399 | A | | 9/1985 | Jenkins, III et al. |
| 4,564,647 | A | | 1/1986 | Hayashi et al. |
| 4,673,719 | A | | 6/1987 | Kioka et al. |
| 4,716,206 | A | | 12/1987 | Fujita et al. |
| 4,739,015 | A | | 4/1988 | Toyota et al. |
| 4,752,597 | A | | 6/1988 | Turner |
| 4,792,592 | A | * | 12/1988 | Fulks et al. .................... 526/62 |
| 4,803,251 | A | | 2/1989 | Goode et al. |
| 4,855,370 | A | | 8/1989 | Chirillo et al. |
| 4,876,320 | A | | 10/1989 | Fulks et al. |
| 4,882,400 | A | | 11/1989 | Dumain et al. |
| 5,034,479 | A | | 7/1991 | Eisinger et al. |
| 5,106,804 | A | | 4/1992 | Bailly et al. |
| 5,132,380 | A | | 7/1992 | Stevens et al. |
| 5,162,463 | A | | 11/1992 | Baker et al. |
| 5,194,526 | A | | 3/1993 | Hussein et al. |
| 5,200,477 | A | | 4/1993 | Baker et al. |
| 5,227,440 | A | | 7/1993 | Canich et al. |
| 5,229,076 | A | | 7/1993 | Fagher |
| 5,283,278 | A | | 2/1994 | Daire et al. |
| 5,296,565 | A | | 3/1994 | Ueda et al. |
| 5,324,800 | A | | 6/1994 | Welborn, Jr. et al. |
| 5,331,071 | A | | 7/1994 | Kataoka et al. |
| 5,332,706 | A | | 7/1994 | Nowlin et al. |
| 5,350,723 | A | | 9/1994 | Neithamer et al. |
| 5,352,749 | A | | 10/1994 | DeChellis et al. |
| 5,385,991 | A | | 1/1995 | Yamaguchi et al. |
| 5,399,635 | A | | 3/1995 | Neithamer et al. |
| 5,416,175 | A | | 5/1995 | Song et al. |
| 5,432,236 | A | | 7/1995 | Sano et al. |
| 5,466,766 | A | | 11/1995 | Patsidis et al. |
| 5,468,702 | A | | 11/1995 | Jejelowo |
| 5,474,962 | A | | 12/1995 | Takahashi et al. |
| 5,541,270 | A | | 7/1996 | Chinh et al. |
| 5,578,537 | A | | 11/1996 | Herrmann et al. |
| 5,625,012 | A | | 4/1997 | Hussein et al. |
| 5,677,375 | A | | 10/1997 | Rifi et al. |
| 5,731,392 | A | | 3/1998 | Ali et al. |
| 5,780,379 | A | | 7/1998 | Fiasse |
| 5,834,571 | A | | 11/1998 | Bernier et al. |
| 5,863,853 | A | | 1/1999 | Vaughan et al. |
| 5,948,872 | A | | 9/1999 | Kioka et al. |
| 6,187,879 | B1 | | 2/2001 | Ford et al. |
| 6,191,238 | B1 | | 2/2001 | Ford et al. |

FOREIGN PATENT DOCUMENTS

| BE | 839380 | | 9/1976 |
|---|---|---|---|
| CA | 991798 | | 6/1976 |
| EP | 0 359 444 | * | 3/1990 |
| EP | 0 359 444 A1 | | 3/1990 |
| EP | 0 614 917 A1 | | 9/1994 |
| EP | 0 703 246 A1 | | 3/1996 |
| EP | 0 719 803 A2 | | 7/1996 |
| FR | 1180416 | | 6/1959 |
| GB | 851113 | | 10/1960 |
| WO | WO 00/24789 A1 | | 5/2000 |
| WO | WO 00/24790 A2 | | 5/2000 |

OTHER PUBLICATIONS

US 5,883,203, 3/1999, Cheruvu et al. (withdrawn)
*Chemical & Engineering News*, 1985, p. 27, vol. 63, Issue 5.

* cited by examiner

Primary Examiner—David W. Wu
Assistant Examiner—William Cheung
(74) Attorney, Agent, or Firm—Charles R. Richard; Bernard J. Graves, Jr.

(57) ABSTRACT

A novel process for producing homopolymers and interpolymers of olefins which involves contacting an olefin and/or an olefin and at least one or more other olefin(s) under polymerization conditions with a metallocene catalyst and dinitrogen monoxide in amounts sufficient to reduce the electrostatic charge in the polymerization medium. Also provided is a process for reducing electrostatic charge in the production of polyolefins by introducing dinitrogen monoxide into the polymerization medium.

30 Claims, No Drawings

PROCESS FOR PRODUCING POLYOLEFINS

CROSS-REFERENCE TO RELATED APPLICATIONS

This is a continuation-in-part application of application Ser. No. 09/387,598 filed on Aug. 31, 1999 now abandoned, the entire content of which is hereby incorporated by reference. Related are U.S. Pat. Nos. 6,187,879 and 6,191,238.

FIELD OF INVENTION

The present invention relates to a polymerization process for the production of polyolefins utilizing a metallocene catalyst and dinitrogen monoxide ($N_2O$) in amounts sufficient to reduce the electrostatic charge in the polymerization reactor. The use of dinitrogen monoxide as a catalytic agent further provides polyolefins that are suitable for molding and film applications.

BACKGROUND OF INVENTION

Polyolefins such as polyethylene are well known and are useful in many applications. In particular, linear polyethylene polymers possess properties which distinguish them from other polyethylene polymers, such as branched ethylene homopolymers commonly referred to as LDPE (low density polyethylene). Certain of these properties are described by Anderson et al, U.S. Pat. No. 4,076,698.

A particularly useful polymerization medium for producing polyethylene and polypropylene polymers is a gas phase process. Examples of such are given in U.S. Pat. Nos. 3,709,853; 4,003,712; 4,011,382; 4,302,566; 4,543,399; 4,882,400; 5,352,749 and 5,541,270 and Canadian Patent No. 991,798 and Belgian Patent No. 839,380.

Metallocene catalysts are known for polymerizing and interpolymerizing olefins such as ethylene. Metallocene catalysts comprise at least one transition metal component having at least one moiety selected from substituted or unsubstituted cyclopentadienyl, substituted or unsubstituted pentadienyl, substituted or unsubstituted pyrrole, substituted or unsubstituted phosphole, substituted or unsubstituted arsole, substituted or unsubstituted boratabenzene, and substituted or unsubstituted carborane, and at least one co-catalyst component. Typical organometallic co-catalysts are alkyl aluminoxanes, such as methyl aluminoxane, and boron containing compounds such as tris(perfluorophenyl) boron and salts of tetrakis(perfluorophenyl)borate.

The metallocene catalysts can be supported on an inert porous particulate carrier A generally encountered problem in polymerization processes, in particular gas phase polymerization processes, is the formation of agglomerates. Agglomerates can form in various places such as the polymerization reactor and the lines for recycling the gaseous stream. As a consequence of agglomerate formation it may be necessary to shut down the reactor.

When agglomerates form within the polymerization reactor there can be many adverse effects. For example, the agglomerates can disrupt the removal of polymer from the polymerization reactor by plugging the polymer discharge system. Further, if the agglomerates fall and cover part of the fluidization grid a loss of fluidization efficiency may occur. This can result in the formation of larger agglomerates which can lead to the loss of the entire fluidized bed. In either case there may be the necessity for the shutdown of the reactor.

It has been found that agglomerates may be formed as a result of the presence of very fine polymer particles in the polymerization medium. These fine polymer particles may be present as a result of introducing fine catalyst particles or breakage of the catalyst within the polymerization medium.

These fine particles are believed to deposit onto and electrostatically adhere to the inner walls of the polymerization reactor and the associated equipment for recycling the gaseous stream such as, for example, the heat exchanger. If the fine particles remain active, and the polymerization reaction continues, then the particles will grow in size resulting in the formation of agglomerates. These agglomerates when formed within the polymerization reactor tend to be in the form of sheets.

Several solutions have been proposed to resolve the problem of formation of agglomerates in gas phase polymerization processes. These solutions include the deactivation of the fine polymer particles, control of the catalyst activity and the reduction of the electrostatic charge. Exemplary of the solutions are as follows.

European Patent Application 0 359 444 A1 describes the introduction into the polymerization reactor of small amounts of an activity retarder in order to keep substantially constant either the polymerization rate or the content of transition metal in the polymer produced. The process is said to produce a polymer without forming agglomerates.

U.S. Pat. No. 4,739,015 describes the use of gaseous oxygen containing compounds or liquid or solid active-hydrogen containing compounds to prevent the adhesion of the polymer to itself or to the inner wall of the polymerization apparatus.

In U.S. Pat. No. 4,803,251 there is described a process for reducing sheeting utilizing a group of chemical additives which generate both positive and negative charges in the reactor, and which are fed to the reactor in an amount of a few parts per million (ppm) per part of the monomer in order to prevent the formation of undesired positive or negative charges.

Other processes and other additives that may be used to neutralize electrostatic charge in the fluidized-bed reactor are found in U.S. Pat. Nos. 4,792,592; 4,803,251; 4,855,370; 4,876,320; 5,162,463; 5,194,526 and 5,200,477.

Additional processes for reducing or eliminating electrostatic charge include (1) installation of grounding devices in a fluidized bed, (2) ionization of gas or particles by electrical discharge to generate ions which neutralize electrostatic charge on the particles and (3) the use of radioactive sources to produce radiation capable of generating ions which neutralize electrostatic charge on the particles.

It would be desirable therefore to provide a process for producing polyolefins, particularly polyethylene, wherein the problems associated with electrostatic charge are reduced.

SUMMARY OF THE INVENTION

The polymerization process of the present invention comprises the introduction into a polymerization medium comprising an olefin, particularly ethylene, and optionally at least one or more other olefin(s), at least one metallocene catalyst comprising at least one transition metal component having at least one moiety selected from substituted or unsubstituted cyclopentadienyl, substituted or unsubstituted pentadienyl, substituted or unsubstituted pyrrole, substituted or unsubstituted phosphole, substituted or unsubstituted arsole, substituted or unsubstituted boratabenzene, and substituted or unsubstituted carborane, and at least one co-catalyst component, and dinitrogen monoxide ($N_2O$), wherein the dinitrogen monoxide is present in an amount sufficient to reduce the electrostatic charge in the polymerization medium to a level lower than would occur in the same polymerization process in the absence of the dinitrogen monoxide.

The present invention also relates to a process for reducing electrostatic charge in a polymerization medium comprising an olefin, particularly ethylene, and optionally at least one or more other olefin(s), at least one metallocene catalyst comprising at least one transition metal component having at least one moiety selected from substituted or unsubstituted cyclopentadienyl, substituted or unsubstituted pentadienyl, substituted or unsubstituted pyrrole, substituted or unsubstituted phosphole, substituted or unsubstituted arsole, substituted or unsubstituted boratabenzene, and substituted or unsubstituted carborane, and at least one co-catalyst component, and dinitrogen monoxide ($N_2O$), comprising introducing the dinitrogen monoxide into the polymerization medium in an amount sufficient to reduce electrostatic charge in the polymerization medium to a level lower than would occur in the same polymerization process in the absence of the dinitrogen monoxide.

All mention herein to elements of Groups of the Periodic Table are made in reference to the Periodic Table of the Elements, as published in "Chemical and Engineering News", 63(5), 27, 1985. In this format, the Groups are numbered 1 to 18.

DETAILED DESCRIPTION OF THE INVENTION

The polymerization process of the present invention comprises the introduction into a polymerization medium comprising an olefin, particularly ethylene, and optionally at least one or more other olefin(s), at least one metallocene catalyst comprising at least one transition metal component having at least one moiety selected from substituted or unsubstituted cyclopentadienyl, substituted or unsubstituted pentadienyl, substituted or unsubstituted pyrrole, substituted or unsubstituted phosphole, substituted or unsubstituted arsole, substituted or unsubstituted boratabenzene, and substituted or unsubstituted carborane, and at least one co-catalyst component, and dinitrogen monoxide ($N_2O$), wherein the dinitrogen monoxide is present in an amount sufficient to reduce the electrostatic charge in the polymerization medium to a level lower than would occur in the same polymerization process in the absence of the dinitrogen monoxide.

The present invention also relates to a process for reducing electrostatic charge in a polymerization medium comprising an olefin, particularly ethylene, and optionally at least one or more other olefin(s), at least one metallocene catalyst comprising at least one transition metal component having at least one moiety selected from substituted or unsubstituted cyclopentadienyl, substituted or unsubstituted pentadienyl, substituted or unsubstituted pyrrole, substituted or unsubstituted phosphole, substituted or unsubstituted arsole, substituted or unsubstituted boratabenzene, and substituted or unsubstituted carborane, and at least one co-catalyst component, and dinitrogen monoxide ($N_2O$), comprising introducing the dinitrogen monoxide into the polymerization medium in an amount sufficient to reduce electrostatic charge in the polymerization medium to a level lower than would occur in the same polymerization process in the absence of the dinitrogen monoxide.

The polymerization reaction of the present invention is carried out in the presence of at least one metallocene catalyst. In the process of the invention, the catalyst can be introduced in any manner known in the art. For example, the catalyst can be introduced directly into the fluidized bed reactor in the form of a solution, a slurry or a dry free flowing powder. The catalyst can also be used in the form of a deactivated catalyst, or in the form of a prepolymer obtained by contacting the catalyst with one or more olefins in the presence of a co-catalyst.

Metallocene catalysts are well known in the industry and are comprised of at least one transition metal component and at least one co-catalyst component. The transition metal component of the metallocene catalyst comprises a compound having at least one moiety selected from substituted or unsubstituted cyclopentadienyl, substituted or unsubstituted pentadienyl, substituted or unsubstituted pyrrole, substituted or unsubstituted phosphole, substituted or unsubstituted arsole, substituted or unsubstituted boratabenzene, and substituted or unsubstituted carborane, and at least one transition metal. Preferably the moiety is a substituted or unsubstituted cyclopentadienyl. The transition metal is selected from Groups 3, 4, 5, 6, 7, 8, 9 and 10 of the Periodic Table of the Elements. Exemplary of such transition metals are scandium, titanium, zirconium, hafnium, vanadium, chromium, manganese, iron, cobalt, nickel, and the like, and mixtures thereof. In a preferred embodiment the transition metal is selected from Groups 4, 5 or 6 such as, for example, titanium, zirconium, hafnium, vanadium and chromium, and in a still further preferred embodiment, the transition metal is titanium or zirconium or mixtures thereof.

The co-catalyst component of the metallocene catalyst can be any compound, or mixtures thereof, that can activate the transition metal component(s) of the metallocene catalyst in olefin polymerization. Typically the co-catalyst is an alkylaluminoxane such as, for example, methylaluminoxane (MAO) and aryl substituted boron containing compounds such as, for example, tris(perfluorophenyl)borane and the salts of tetrakis(perfluorophenyl)borate.

There are many references describing metallocene catalysts in great detail. For example, metallocene catalysts are described in U.S. Pat. Nos. 4,564,647; 4,752,597; 5,106, 804; 5,132,380; 5,227,440; 5,296,565; 5,324,800; 5,331, 071; 5,332,706; 5,350,723; 5,399,635; 5,466,766; 5,468, 702; 5,474,962; 5,578,537 and 5,863,853. The entire contents of these patents are incorporated herein by reference.

The metallocene catalysts herein also include catalyst systems such as $[C_5H_5B-OEt]_2ZrCl_2$, $[C_5H_4CH_2CH_2NMe_2]TiCl_3$, $[PC_4Me_3Si(Me)_2NCMe_3]$ $ZrCl_2$, $[C_5Me_4Si(Me)_2NCMe_3]TiCl_2$, and $(C_5H_5)(C_5H_7)$ $ZrCl_2$.

The metallocene catalysts herein can be introduced in the process of the present invention in any manner. For example, the catalyst components can be introduced directly into the polymerization medium in the form of a solution, a slurry or a dry free flowing powder. The transition metal component(s) and the co-catalyst component(s) of the metallocene catalyst can be premixed to form an activated catalyst prior to addition to the polymerization medium, or the components can be added separately to the polymerization medium, or the components can be premixed and then contacted with one or more olefins to form a prepolymer and then added to the polymerization medium in prepolymer form. When the catalyst components are premixed prior to introduction into the reactor, any electron donor compound may be added to the catalyst to control the level of activity of the catalyst. Furthermore, there may be added additional organometallic compounds, such as trialkylaluminums, to the polymerization medium.

Any or all of the components of the metallocene catalyst can be supported on a carrier. The carrier can be any particulate organic or inorganic material. Preferably the carrier particle size should not be larger than about 200 microns in diameter. The most preferred particle size of the carrier material can be easily established by experiment. Preferably, the carrier should have an average particle size of 5 to 200 microns in diameter, more preferably 10 to 150 microns and most preferably 20 to 100 microns.

Examples of suitable inorganic carriers include metal oxides, metal hydroxides, metal halogenides or other metal salts, such as sulphates, carbonates, phosphates, nitrates and silicates. Exemplary of inorganic carriers suitable for use herein are compounds of metals from Groups 1 and 2 of the Periodic Table of the Elements, such as salts of sodium or potassium and oxides or salts of magnesium or calcium, for instance the chlorides, sulphates, carbonates, phosphates or silicates of sodium, potassium, magnesium or calcium and the oxides or hydroxides of, for instance, magnesium or calcium. Also suitable for use are inorganic oxides such as silica, titania, alumina, zirconia, chromia, boron oxide, silanized silica, silica hydrogels, silica xerogels, silica aerogels, and mixed oxides such as talcs, silica/chromia, silica/chromia/titania, silica/alumina, silica/titania, silica/magnesia, silica/magnesia/titania, aluminum phosphate gels, silica co-gels and the like. The inorganic oxides may contain small amounts of carbonates, nitrates, sulfates and oxides such as $Na_2CO_3$, $K_2CO_3$, $CaCO_3$, $MgCO_3$, $Na_2SO_4$, $Al_2(SO_4)_3$, $BaSO_4$, $KNO_3$, $Mg(NO_3)_2$, $Al(NO_3)_3$, $Na_2O$, $K_2O$ and $Li_2O$. Carriers comprising at least one component selected from the group consisting of $SiO_2$, $Al_2O_3$ or mixtures thereof as a main component are preferred.

Examples of suitable organic carriers include polymers such as, for example, polyethylene, polypropylene, copolymers of ethylene and alpha-olefins, polystyrene, and functionalized polystyrene.

The metallocene catalyst may be prepared by any method known in the art. The catalyst can be in the form of a solution, a slurry or a dry free flowing powder. The amount of metallocene catalyst used is that which is sufficient to allow production of the desired amount of the polyolefin.

Any halogenated hydrocarbon may be used in the process of the present invention. If desired more than one halogenated hydrocarbon can be used. Typical of such halogenated hydrocarbons are monohalogen and polyhalogen substituted saturated or unsaturated aliphatic, alicyclic, or aromatic hydrocarbons having 1 to 12 carbon atoms. Preferred for use in the process of the present invention are dichloromethane, chloroform, carbon tetrachloride, chlorofluoromethane, chlorodifluromethane, dichlorodifluoromethane, fluorodichloromethane, chlorotrifluoromethane, fluorotrichloromethane and 1,2-dichloroethane. Most preferred for use in the process of the present invention is chloroform.

In carrying out the polymerization process of the present invention the co-catalyst(s) is added to the transition metal component of the metallocene catalyst in any amount sufficient to effect production of the desired polyolefin. It is preferred to utilize the co-catalyst(s) in a molar ratio of co-catalyst(s) to the transition metal component ranging from about 0.5:1 to about 10000:1. In a more preferred embodiment, the molar ratio of co-catalyst(s) to transition metal component ranges from about 0.5:1 to about 1000:1.

The polymerization process of the present invention may be carried out using any suitable process, for example, solution, slurry and gas phase. A particularly desirable method for producing polyolefin polymers according to the present invention is a gas phase polymerization process preferably utilizing a fluidized bed reactor. This type reactor and means for operating the reactor are well known and completely described in U.S. Pat. Nos. 3,709,853; 4,003,712; 4,011,382; 4,012,573; 4,302,566; 4,543,399; 4,882,400; 5,352,749; 5,541,270; Canadian Patent No. 991,798 and Belgian Patent No. 839,380. These patents disclose gas phase polymerization processes wherein the polymerization medium is either mechanically agitated or fluidized by the continuous flow of the gaseous monomer and diluent. The entire contents of these patents are incorporated herein by reference.

In general, the polymerization process of the present invention may be effected as a continuous gas phase process such as a fluid bed process. A fluid bed reactor for use in the process of the present invention typically comprises a reaction zone and a so-called velocity reduction zone. The reaction zone comprises a bed of growing polymer particles, formed polymer particles and a minor amount of catalyst particles fluidized by the continuous flow of the gaseous monomer and diluent to remove heat of polymerization through the reaction zone. Optionally, some of the recirculated gases may be cooled and compressed to form liquids that increase the heat removal capacity of the circulating gas stream when readmitted to the reaction zone. A suitable rate of gas flow may be readily determined by simple experiment. Make up of gaseous monomer to the circulating gas stream is at a rate equal to the rate at which particulate polymer product and monomer associated therewith is withdrawn from the reactor and the composition of the gas passing through the reactor is adjusted to maintain an essentially steady state gaseous composition within the reaction zone. The gas leaving the reaction zone is passed to the velocity reduction zone where entrained particles are removed. Finer entrained particles and dust may be removed in a cyclone and/or fine filter. The gas is passed through a heat exchanger wherein the heat of polymerization is removed, compressed in a compressor and then returned to the reaction zone.

In more detail, the reactor temperature of the fluid bed process herein ranges from about 30° C. to about 150° C. In general, the reactor temperature is operated at the highest temperature that is feasible taking into account the sintering temperature of the polymer product within the reactor.

The process of the present invention is suitable for the production of homopolymers of olefins, particularly ethylene, and/or copolymers, terpolymers, and the like, of olefins, particularly ethylene, and at least one or more other olefin(s). Preferably the olefins are alpha-olefins. The olefins, for example, may contain from 2 to 16 carbon atoms. Particularly preferred for preparation herein by the process of the present invention are polyethylenes. Such polyethylenes are preferably homopolymers of ethylene and interpolymers of ethylene and at least one alpha-olefin wherein the ethylene content is at least about 50% by weight of the total monomers involved. Exemplary olefins that may be utilized herein are ethylene, propylene, 1-butene, 1-pentene, 1-hexene, 1-heptene, 1-octene, 4-methylpent-1-ene, 1-decene, 1-dodecene, 1-hexadecene and the like. Also utilizable herein are polyenes such as 1,3-hexadiene, 1,4-hexadiene, cyclopentadiene, dicyclopentadiene, 4-vinylcyclohex-1-ene, 1,5-cyclooctadiene, 5-vinylidene-2-norbornene and 5-vinyl-2-norbornene, and olefins formed in situ in the polymerization medium. When olefins are formed in situ in the polymerization medium, the formation of polyolefins containing long chain branching may occur.

In carrying out the polymerization process of the present invention the dinitrogen monoxide utilized to reduce electrostatic charge in the polymerization medium is added in any manner. For example, the dinitrogen monoxide may be added to the preformed catalyst, to the prepolymer during the prepolymerization step, to the preformed prepolymer and/or to the polymerization medium. The dinitrogen monoxide may optionally be premixed with the co-catalyst when utilized. The dinitrogen monoxide is added in any amount sufficient to reduce the electrostatic charge in the polymerization medium to a level lower than would occur in the same polymerization process in the absence of the dinitrogen monoxide. It is preferred to incorporate the dinitrogen monoxide in the polymerization medium in an amount ranging from about 1 ppm to about 10,000 ppm by volume.

In carrying out the polymerization process of the present invention, the halogenated hydrocarbon may be added to the polymerization medium in any amount sufficient to effect production of the desired polyolefin. It is preferred to incorporate the halogenated hydrocarbon in a molar ratio of halogenated hydrocarbon to transition metal component of the metallocene catalyst ranging from about 0.001:1 to about 10:1. In a more preferred embodiment, the molar ratio of halogenated hydrocarbon to transition metal component ranges from about 0.001:1 to about 10:1.

The molecular weight of the polyolefin produced by the present invention can be controlled in any known manner, for example, by using hydrogen. The molecular weight control of polyethylene, for example, may be evidenced by an increase in the melt index ($I_2$) of the polymer when the molar ratio of hydrogen to ethylene in the polymerization medium is increased.

Any conventional additive may be added to the polyolefins obtained by the present invention. Examples of the additives include nucleating agents, heat stabilizers, antioxidants of phenol type, sulfur type and phosphorus type, lubricants, antistatic agents, dispersants, copper harm inhibitors, neutralizing agents, foaming agents, plasticizers, anti-foaming agents, flame retardants, crosslinking agents, flowability improvers such as peroxides, ultraviolet light absorbers, light stabilizers, weathering stabilizers, weld strength improvers, slip agents, anti-blocking agents, anti-fogging agents, dyes, pigments, natural oils, synthetic oils, waxes, fillers and rubber ingredients.

The polyolefins, particularly polyethylenes, of the present invention may be fabricated into films by any technique known in the art. For example, films may be produced by the well known cast film, blown film and extrusion coating techniques.

Further, the polyolefins, particularly polyethylenes, may be fabricated into other articles of manufacture, such as molded articles, by any of the well known techniques.

The invention will be more readily understood by reference to the following examples. There are, of course, many other forms of this invention which will become obvious to one skilled in the art, once the invention has been fully disclosed, and it will accordingly be recognized that these examples are given for the purpose of illustration only, and are not to be construed as limiting the scope of this invention in any way.

EXAMPLES

Polymerization Process

The polymerization process utilized in Examples 1–28 herein is carried out in a fluidized-bed reactor for gas-phase polymerization, consisting of a vertical cylinder of diameter 0.74 meters and height 7 meters and surmounted by a velocity reduction chamber. The reactor is provided in its lower part with a fluidization grid and with an external line for recycling gas, which connects the top of the velocity reduction chamber to the lower part of the reactor, at a point below the fluidization grid. The recycling line is equipped with a compressor for circulating gas and a heat transfer means such as a heat exchanger. In particular the lines for supplying ethylene, an olefin such as 1-butene, 1-pentene and 1-hexene, hydrogen and nitrogen, which represent the main constituents of the gaseous reaction mixture passing through the fluidized bed, feed into the recycling line. The dinitrogen monoxide utilized to reduce electrostatic charge is fed directly into the recycling line. Above the fluidization grid, the reactor contains a fluidized bed consisting of a polyethylene powder made up of particles with a weight-average diameter of about 0.5 mm to about 1.4 mm. The gaseous reaction mixture, which contains ethylene, olefin comonomer, hydrogen, nitrogen and minor amounts of other components, passes through the fluidized bed under a pressure ranging from about 280 psig to about 300 psig with an ascending fluidization speed, referred to herein as fluidization velocity, ranging from about 1.6 feet per second to about 2.0 feet per second.

The electrostatic charge of the fluidized bed was measured by a Correflow Model 3400 Electrostatic Monitor (ESM) supplied by Auburn International, Inc. of Danvers, Mass. The electrostatic probe was installed in the vertical cylindrical section of the reactor at a height such as to be within the fluidized bed of polymer particles. The electrostatic probe measures the current flow between the polymerization medium and the ground. A reduction in electrostatic charge is defined as a reduction in the absolute magnitude of the measured current and/or a reduction in the variability of the measured current.

Example 1

The polymerization process is carried out as described above. The olefins used herein are ethylene and 1-hexene. Hydrogen is used to control molecular weight. The metallocene catalyst contains bis(1-butyl-3-methylcyclopentadienyl)zirconium dichloride and methylaluminoxane supported on silica. An ethylene/1-hexene interpolymer can be prepared under these conditions.

The level of electrostatic charge in the polymerization reactor is measured. Thereafter, dinitrogen monoxide is added to the polymerization medium and the level of electrostatic charge is expected to be reduced.

Example 2

The process of Example 1 is followed with the exception that 1-hexene is not utilized and a homopolymer of ethylene can be produced. The level of electrostatic charge in the polymerization reactor is measured. Thereafter, dinitrogen monoxide is added to the polymerization medium and the level of electrostatic charge is expected to be reduced.

Examples 3–7

The process of Example 1 is followed with the exception that in place of the 1-hexene there is utilized the following comonomers:

| | |
|---|---|
| Example 3 | propylene, |
| Example 4 | 1-butene, |
| Example 5 | 1-pentene, |
| Example 6 | 4-methylpent-1-ene, |
| Example 7 | 1-octene. |

In each of the above Examples 3–7 the level of electrostatic charge in the polymerization medium is expected to be reduced as a result of incorporating dinitrogen monoxide in the polymerization medium.

Examples 8–28

The process of Example 1 is followed with the exception that the supported metallocene catalyst is replaced with the following silica supported metallocene catalysts:

| | |
|---|---|
| Example 8 | bis(1-butyl-3-methylcyclopentadienyl)dimethylzirconium and tris(perfluorophenyl)borane, |
| Example 9 | bis(1-butyl-3-methylcyclopentadienyl)dimethylzirconium and triphenylmethylium tetrakis(perfluorophenyl)borate, |
| Example 10 | (tert-butylamido)dimethyl(tetramethyl-$\eta^5$-cyclopentadienyl)silanetitaniumdimethyl and triphenylmethylium tetrakis(perfluorophenyl)borate, |
| Example 11 | (tert-butylamido)dimethyl(tetramethyl-$\eta^5$-cyclopentadienyl)silanetitaniumdimethyl and tris(perfluorophenyl)borane, |
| Example 12 | (tert-butylamido)dimethyl(tetramethyl-$\eta^5$-cyclopentadienyl)silanetitaniumdimethyl and methylaluminoxane. |
| Example 13 | bis(indenyl)zirconium dichloride and methylaluminoxane. |
| Example 14 | bis(fluorenyl)zirconium dichloride and methylaluminoxane. |
| Example 15 | cyclopentadienyl(1-methylboratabenzene)zirconium dichloride and methylaluminoxane. |
| Example 16 | cyclopentadienyl(1-methyl-2-trimethylsilylboratabenzene)zirconium dichloride and methylaluminoxane. |
| Example 17 | cyclopentadienyl(3,4-dimethylphospholyl)zirconium dichloride and methylaluminoxane. |
| Example 18 | cyclopentadienyl(2,3,4,5-tetramethylphospholyl)zirconium dichloride and methylaluminoxane. |
| Example 19 | bis(2,3,4,5-tetramethylphospholyl)zirconium dichloride and methylaluminoxane. |
| Example 20 | bis(2,5-diphenyl-3-methylphospholyl)zirconium dichloride and methylaluminoxane. |
| Example 21 | pentamethylcyclopentadienyl(2,3,4,5-tetramethylarsolyl)zirconium dichloride and methylaluminoxane. |
| Example 22 | bis(2,3,4,5-tetramethylarsolyl)zirconium dichloride and methylaluminoxane. |
| Example 23 | bis(2,3,-dimethylarsolyl)zirconium dichloride and methylaluminoxane. |
| Example 24 | bis(2,3,4,5-tetramethylpyrrolyl)zirconium dichloride and methylaluminoxane. |
| Example 25 | pentamethylcyclopentadienyl(2,3,4,5-tetramethylpyrrolyl)zirconium dichloride and methylaluminoxane. |
| Example 26 | pentamethylcyclopentadienyl[(7,8,9,10,11-$\eta$)-undecahydro-7,8-dicarbaundecaborato(2-)]methylzirconium |
| Example 27 | (N-tert-butylamido)(dimethyl)(2,4-dimethyl-$\eta_5$-pentadien-1-yl)silanetitanium(IV) dichloride and methylaluminoxane. |
| Example 28 | (N-tert-butylamido)(dimethyl)(2,4-dimethyl-$\eta_5$-pentadien-3-yl)silanetitanium(IV) dimethyl and methylaluminoxane. |

In each of the above Examples 8–28 the level of electrostatic charge in the polymerization medium is expected to be reduced as a result of incorporating dinitrogen monoxide in the polymerization medium.

Films can be prepared from the polyolefins of the present invention.

Articles such as molded items can also be prepared from the polyolefins of the present invention.

It should be clearly understood that the forms of the invention herein described are illustrative only and are not intended to limit the scope of the invention. The present invention includes all modifications falling within the scope of the following claims.

We claim:

1. A process for polymerizing an olefin and/or polymerization an olefin and at least one or more other olefin(s) comprising contacting, under polymerization conditions, the olefin and/or the olefin and at least one or more other olefin(s) with at least one metallocene catalyst comprising at least one transition metal component having at least one moiety selected from the group consisting of substituted or unsubstituted cyclopentadienyl, substituted or unsubstituted pentadienyl, substituted or unsubstituted pyrrole, substituted or unsubstituted phosphole, substituted or unsubstituted arsole, substituted or unsubstituted boratabenzene, and substituted or unsubstituted carborane, and at least one co-catalyst component, and dinitrogen monoxide, wherein the dinitrogen monoxide is present in an amount sufficient to reduce electrostatic charge in the polymerization medium to a level lower than would be obtained in the absence of dinitrogen monoxide.

2. The process according to claim 1 wherein the metal of the transition metal component comprises at least one metal selected from the group consisting of Groups 3, 4, 5, 6, 7, 8, 9 and 10 of the Periodic Table of the Elements, as defined herein.

3. The process according to claim 2 wherein the metal is selected from the group consisting of titanium, zirconium, hafnium, vanadium and chromium.

4. The process according to claim 3 wherein the metal is selected from the group consisting of titanium, zirconium and mixtures thereof.

5. The process according to claim 1 wherein the metallocene catalyst is supported on a carrier.

6. The process according to claim 5 wherein the carrier is selected from the group consisting of silica, alumina, magnesium chloride and mixtures thereof.

7. The process according to claim 1 further comprising adding a halogenated hydrocarbon to the polymerization medium.

8. The process according to claim 7 wherein the halogenated hydrocarbon is selected from the group consisting of dichloromethane, chloroform, carbon tetrachloride, chlorofluoromethane, chlorodifluromethane, dichlorodifluoromethane, fluorodichloromethane, chlorotrifluoromethane, fluorotrichloromethane and 1,2-dichloroethane.

9. The process according to claim 8 wherein the halogenated hydrocarbon is chloroform.

10. The process according to claim 1 wherein the dinitrogen monoxide is added in an amount ranging from about 1 ppm to about 10,000 ppm by volume.

11. The process according to claim 1 wherein the polymerization medium is gas phase.

12. The process according to claim 1 wherein the polymerization medium is slurry phase.

13. The process according to claim 1 wherein the olefin is ethylene and the at least one or more other olefin(s) is selected from the group consisting of olefins having 3 to 16 carbon atoms.

14. The process according to claim 13 wherein the at least one or more other olefin(s) is selected from the group consisting of 1-octene, 1-hexene, 4-methylpent-1-ene, 1-pentene, 1-butene and propylene.

15. The process according to claim 13 wherein the interpolymer resulting from the polymerization of ethylene and at least one or more olefin(s) comprises ethylene in an amount of at least about 50% by weight of the interpolymer.

16. A process for reducing electrostatic charge in a polymerization medium, the polymerization comprising an olefin optionally and at least one or more other olefin(s), at least one metallocene catalyst comprising at least one transition metal component having at least one moiety selected from the group consisting of substituted or unsubstituted cyclopentadienyl, substituted or unsubstituted pentadienyl, substituted or unsubstituted pyrrole, substituted or unsubstituted phosphole, substituted or unsubstituted arsole, substituted or unsubstituted boratabenzene, and substituted or unsubstituted carborane, and at least one co-catalyst component the process, comprising introducing into the polymerization medium dinitrogen monoxide in an amount sufficient to reduce electrostatic charge in the polymerization medium to a level lower than would be obtained in the absence of dinitrogen monoxide.

17. The process according to claim 16 wherein the metal of the transition metal component comprises at least one metal selected from the group consisting of Groups 3, 4, 5, 6, 7, 8, 9 and 10 of the Periodic Table of the Elements, as defined herein.

18. The process according to claim 17 wherein the metal is selected from the group consisting of titanium, zirconium, hafnium, vanadium and chromium.

19. The process according to claim 18 wherein the metal is selected from the group consisting of titanium, zirconium and mixtures thereof.

20. The process according to claim 16 wherein the metallocene catalyst is supported on a carrier.

21. The process according to claim 20 wherein the carrier is selected from the group consisting of silica, alumina, magnesium chloride and mixtures thereof.

22. The process according to claim 16 further comprising adding a halogenated hydrocarbon to the polymerization medium.

23. The process according to claim 22 wherein the halogenated hydrocarbon is selected from the group consisting of dichloromethane, chloroform, carbon tetrachloride, chlorofluoromethane, chlorodifluromethane, dichlorodifluoromethane, fluorodichloromethane, chlorotrifluoromethane, fluorotrichloromethane and 1,2-dichloroethane.

24. The process according to claim 23 wherein the halogenated hydrocarbon is chloroform.

25. The process according to claim 16 wherein the dinitrogen monoxide is added in an amount ranging from about 1 ppm to about 10,000 ppm by volume.

26. The process according to claim 16 wherein the polymerization medium is gas phase.

27. The process according to claim 16 wherein the polymerization medium is slurry phase.

28. The process according to claim 16 wherein the olefin is ethylene and the at least one or more other olefin(s) is selected from the group consisting of olefins having 3 to 16 carbon atoms.

29. The process according to claim 28 wherein the at least one or more other olefin(s) is selected from the group consisting of 1-octene, 1-hexene, 4-methylpent-1-ene, 1-pentene, 1-butene and propylene.

30. The process according to claim 28 wherein the interpolymer resulting from the polymerization of ethylene and at least one or more olefin(s) comprises ethylene in an amount of at least about 50% by weight of the interpolymer.

* * * * *

UNITED STATES PATENT AND TRADEMARK OFFICE
CERTIFICATE OF CORRECTION

PATENT NO.    : 6,586,538 B2
DATED         : July 1, 2003
INVENTOR(S)   : Ford et al.

It is certified that error appears in the above-identified patent and that said Letters Patent is hereby corrected as shown below:

Column 10,
Lines 13-14, "polymerization" should be -- polymerizing --

Column 11,
Line 11, "olefin optionally and" should read -- olefin and optionally --

Signed and Sealed this

Ninth Day of September, 2003

JAMES E. ROGAN
*Director of the United States Patent and Trademark Office*